(12) United States Patent
Oshitani et al.

(10) Patent No.: US 8,176,744 B2
(45) Date of Patent: May 15, 2012

(54) REFRIGERATION-CYCLE COMPONENT ASSEMBLY AND VEHICULAR REFRIGERATION SYSTEM

(75) Inventors: Hiroshi Oshitani, Toyota (JP); Mika Gocho, Obu (JP); Yoshiaki Takano, Kosai (JP)

(73) Assignee: Denso Corporation, Kariya (JP)

( * ) Notice: Subject to any disclaimer, the term of this patent is extended or adjusted under 35 U.S.C. 154(b) by 945 days.

(21) Appl. No.: 12/228,676

(22) Filed: Aug. 13, 2008

(65) Prior Publication Data

US 2009/0049854 A1   Feb. 26, 2009

(30) Foreign Application Priority Data

Aug. 21, 2007   (JP) .................. 2007-215216

(51) Int. Cl.
*B60H 1/32* (2006.01)
*F25B 1/06* (2006.01)
(52) U.S. Cl. .......................................... 62/239; 62/500
(58) Field of Classification Search ............... 62/239, 62/500
See application file for complete search history.

(56) References Cited

U.S. PATENT DOCUMENTS

| | | | |
|---|---|---|---|
| 4,713,944 A * | 12/1987 | Januschkowetz | ............... 62/480 |
| 6,834,514 B2 | 12/2004 | Takeuchi et al. | |
| 6,978,637 B2 | 12/2005 | Nishijima et al. | |
| 7,059,150 B2 | 6/2006 | Komatsu et al. | |
| 7,178,359 B2 | 2/2007 | Oshitani et al. | |
| 7,254,961 B2 | 8/2007 | Oshitani et al. | |
| 7,340,908 B2 | 3/2008 | Oshitani et al. | |
| 2005/0268644 A1 * | 12/2005 | Oshitani et al. | .................. 62/500 |
| 2006/0107672 A1 * | 5/2006 | Oshitani et al. | .................. 62/170 |

FOREIGN PATENT DOCUMENTS

| | | |
|---|---|---|
| JP | 06-137695 | 5/1994 |
| JP | 2004-044849 | 2/2004 |
| JP | 2004-168243 | 6/2004 |
| JP | 2004-353935 | 12/2004 |
| JP | 2005-265223 | 9/2005 |
| JP | 2006-125823 | 5/2006 |
| JP | 2006-143124 | 6/2006 |

OTHER PUBLICATIONS

Office action dated Jun. 30, 2009 in corresponding Japanese Application No. 2007-215216.

* cited by examiner

*Primary Examiner* — Frantz Jules
*Assistant Examiner* — Cassey D Bauer
(74) *Attorney, Agent, or Firm* — Harness, Dickey & Pierce, PLC

(57) ABSTRACT

A refrigeration-cycle component assembly includes a pipe connecting member, a box temperature-sensitive expansion valve, an ejector, a passenger-compartment high-pressure pipe, and a passenger-compartment low-pressure pipe. The component assembly is provided in a flat space, which is defined at a side of an air-conditioning unit in a vehicle transverse direction, and which is flat in the vehicle transverse direction. The pipe connecting member and the refrigerant suction portion are intensively arranged at a vehicle front side in the flat space. The component assembly is entirely covered by a heat insulating member.

4 Claims, 6 Drawing Sheets

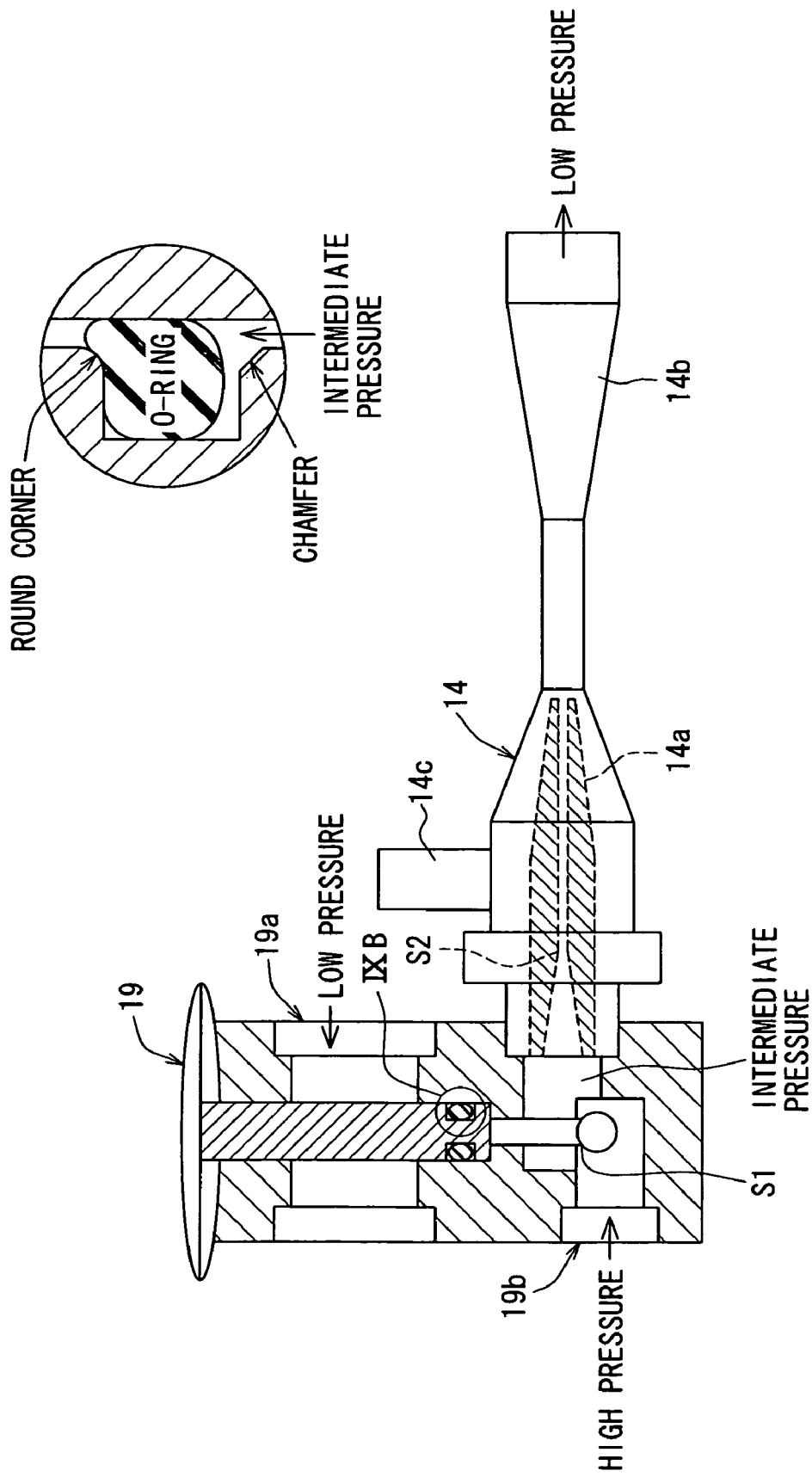

REFRIGERATION-CYCLE COMPONENT ASSEMBLY AND VEHICULAR REFRIGERATION SYSTEM

CROSS REFERENCE TO RELATED APPLICATION

This application is based on and incorporates herein by reference Japanese Patent Application No. 2007-215216 filed on Aug. 21, 2007.

BACKGROUND OF THE INVENTION

1. Field of the Invention

The present invention relates to a refrigeration-cycle component assembly having an ejector, which reduces a pressure of refrigerant and circulates refrigerant, and also relates to a refrigeration cycle having the component assembly.

2. Description of Related Art

JP-A-2006-125823 corresponding to U.S. Pat. No. 7,059,150 describes a refrigeration cycle apparatus for a vehicle, which apparatus includes (a) an ejector that serves as refrigerant pressure reducing means and refrigerant circulating means and (b) a vapor compression refrigeration cycle (ejector cycle) having multiple evaporators. JP-A-2006-125823 describes a configuration for arranging the ejector, a first evaporator, a second evaporator, and a suction pipe, which connects the second evaporator with a refrigerant suction portion of the ejector, in a passenger compartment. Also, JP-A-2005-265223 corresponding to U.S. Pat. No. 7,178,359 describes a refrigeration cycle apparatus that has a box-type temperature-sensitive expansion valve and an ejector, which is provided downstream of the box-type temperature-sensitive expansion valve to be air-tightly connected with a restrictor portion of the box-type temperature-sensitive expansion valve.

However, a specific configuration of arrangement of an ejector in a passenger compartment is not disclosed. In a case, where the ejector is arranged in the passenger compartment, a dedicated layout that allows the ejector to be arranged in a limited space is needed, and also further countermeasures to deal with moisture condensation and a noise generated by a flow of refrigerant are required.

SUMMARY OF THE INVENTION

The present invention is made in view of the above needs. Thus, it is an objective of the present invention to address at least one of the above needs.

To achieve the objective of the present invention, there is provided a refrigeration-cycle component assembly, which includes a pipe connecting member, a box-type temperature-sensitive expansion valve, an ejector, a passenger-compartment high-pressure pipe, and a passenger-compartment low-pressure pipe. The pipe connecting member is provided around a part of a partition panel that separates a passenger compartment from an engine room in a vehicle, and a refrigerant circulation passage for a refrigeration cycle extends through the part of the partition panel. The box-type temperature-sensitive expansion valve is connected with a side of the pipe connecting member toward the passenger compartment. The box-type temperature-sensitive expansion valve includes a first restrictor portion that is pressure reducing means for reducing a pressure of high pressure refrigerant. The box-type temperature-sensitive expansion valve adjusts an amount of refrigerant, which flows through a high-pressure side refrigerant passage, based on a temperature of refrigerant, which flows through a low-pressure side refrigerant passage. The ejector includes a nozzle portion and a pressure increasing portion. The nozzle portion is connected with a downstream side of the first restrictor portion of the box-type temperature-sensitive expansion valve. The nozzle portion includes a second restrictor portion that converts a pressure energy of refrigerant, which flows thereinto from the first restrictor portion, into a speed energy such that refrigerant is expanded in a reduced pressure. The pressure increasing portion suctions vapor-phase refrigerant through the refrigerant suction portion by using a flow of refrigerant ejected through the nozzle portion at a high speed. The pressure increasing portion mixes refrigerant ejected through the nozzle portion with vapor-phase refrigerant suctioned through the refrigerant suction portion for converting the speed energy into the pressure energy such that pressure of refrigerant is increased. The passenger-compartment high-pressure pipe is provided in the passenger compartment for guiding refrigerant flowing out of the pressure increasing portion of the ejector into an evaporator. The passenger-compartment low-pressure pipe is provided in the passenger compartment for guiding refrigerant flowing out of the evaporator into the low-pressure side refrigerant passage of the box-type temperature-sensitive expansion valve. The component assembly is provided in a flat space, which is defined at a side of an air-conditioning unit in a vehicle transverse direction, and which is flat in the vehicle transverse direction. The air-conditioning unit receives the evaporator. The pipe connecting member and the refrigerant suction portion of the component assembly are intensively arranged at a vehicle front side in the flat space. The component assembly is entirely covered by a heat insulating member.

To achieve the objective of the present invention, there is also provided a vehicular refrigeration system that includes the above refrigeration-cycle component assembly.

BRIEF DESCRIPTION OF THE DRAWINGS

The invention, together with additional objectives, features and advantages thereof, will be best understood from the following description, the appended claims and the accompanying drawings in which:

FIG. 9A is a schematic partial cross sectional view showing a connection between a box-type expansion valve and the ejector; and FIG. 9B is an enlarged view of an O-ring portion in FIG. 9A.

DETAILED DESCRIPTION OF PREFERRED EMBODIMENTS

Figure 1:
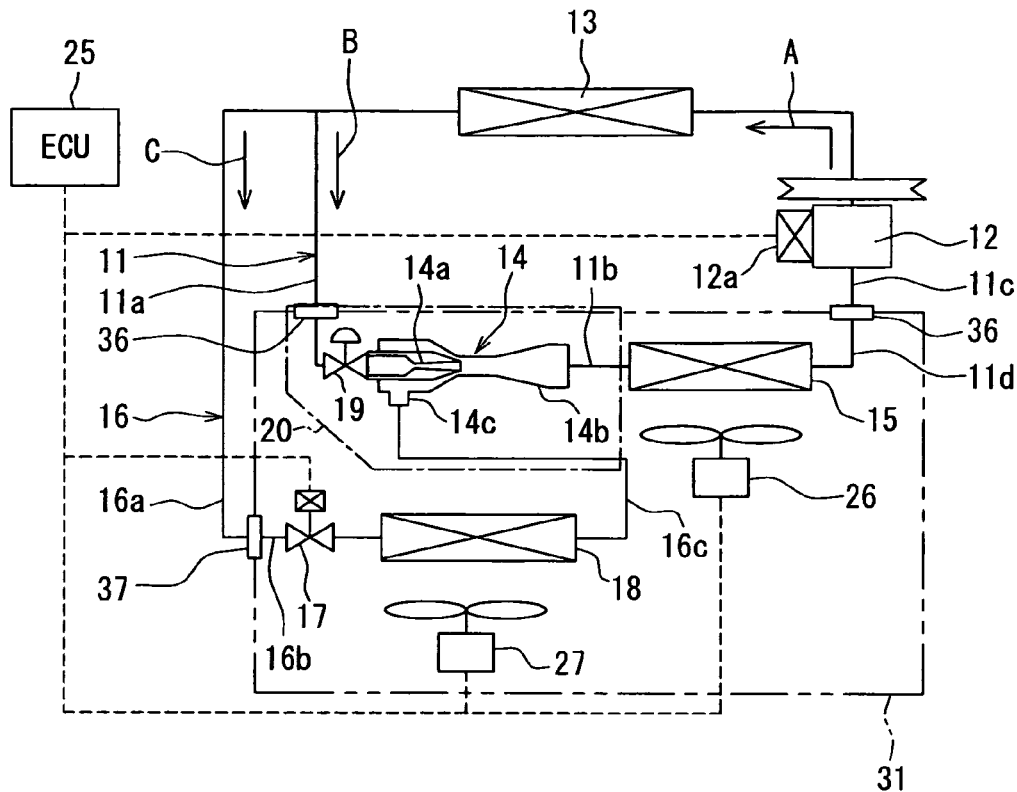
FIG. 1 is a schematic drawing of a cycle showing a vehicular refrigeration system of one embodiment of the present invention.

One embodiment of the present invention will be described with reference to accompanying drawings. A refrigerant circulation channel 11 of the present embodiment is provided with a compressor 12 that intakes and compresses refrigerant. The compressor 12 is rotatably driven by a vehicle engine (not shown) through a belt. In the present embodiment, the compressor 12 employs a variable capacity compressor that adjusts a refrigerant discharge capacity by changing the discharge volume.

In the above, the discharge volume is a geometrical spatial volumetric capacity that corresponds to a refrigerant discharge amount of one rotation. A swash-plate-type compressor may represent the variable capacity compressor 12, and specifically, the swash-plate-type compressor changes a discharge volume by changing an angle of a swash plate to change piston strokes. It should be noted that an electromagnetic pressure control device 12a, which constitutes a volume control mechanism, changes pressure (control pressure) in a swash plate chamber such that an angle of the swash plate is electrically controlled from outside.

There is provided a radiator 13 on a refrigerant discharge side of the compressor 12. The radiator 13 serves as a heat exchanger that performs heat exchange between (a) high pressure refrigerant discharged from the compressor 12 and (b) external air (air outside the passenger compartment) blown by a cooling fan (not shown) for cooling the high pressure refrigerant. A box-type expansion valve 19 (box-type temperature-sensitive expansion valve) and an ejector 14 are directly connected with each other at a position downstream of the radiator 13 in a flow direction of refrigerant. FIGS. 9A and 9B shows the box-type expansion valve 19 in detail. A specific connection structure will be described later.

The box-type expansion valve 19, as shown in FIG. 9A, includes a first restrictor portion S1 for restricting the refrigerant circulation channel 11, and the first restrictor portion S1 serves as pressure reducing means for reducing pressure of high pressure refrigerant. Also, the box-type expansion valve 19 adjusts an amount of refrigerant that flows through a high-pressure side refrigerant passage 19b based on a superheat degree (or a temperature) of refrigerant that flows through a low-pressure side refrigerant passage 19a. It should be noted that the box-type expansion valve 19 is well known and a detailed explanation thereof is omitted.

The ejector 14 serves as pressure reducing means for reducing pressure of refrigerant, and serves as fluid transmission refrigerant circulating means (kinetic vacuum pump) for circulating refrigerant by using suction (involution) caused by the refrigerant flow that is ejected at a high speed. The ejector 14 includes a nozzle portion 14a and a refrigerant suction portion 14c. The nozzle portion 14a restricts an area of a passage for high pressure refrigerant that flows from the radiator 13 such that the nozzle portion 14a causes the high pressure refrigerant to undergo entropy expansion in a reduced pressure. The refrigerant suction portion 14c is provided in the same space with a refrigerant ejection orifice of the nozzle portion 14a for suctioning vapor-phase refrigerant from a second evaporator 18.

Further, a diffuser portion 14b, which serves as a pressure increasing portion, is provided downstream of the nozzle portion 14a and the refrigerant suction portion 14c in the direction of the refrigerant flow. The diffuser portion 14b is formed such that an area of a passage for refrigerant is gradually increased, and thereby pressure of refrigerant is increased by reducing a speed of the refrigerant flow. In other words, the diffuser portion 14b serves to convert a speed energy of refrigerant into a pressure energy.

The refrigerant that flows from the diffuser portion 14b of the ejector 14 enters into a first evaporator 15 (evaporator). The first evaporator 15 is provided inside a case of an air-conditioning unit 10 shown in FIGS. 7, 8, and constitutes cooling means for cooling air used for conditioning the air in the passenger compartment. Specifically, an electric air blower 26 (first air blower) in a passenger-compartment air-conditioning unit blows the air for air conditioning of the passenger compartment into the first evaporator 15. Low pressure refrigerant, pressure of which has been reduced by the ejector 14, evaporates in the first evaporator 15 by absorbing heat from the air for air conditioning of the passenger compartment such that the air for air conditioning of the passenger compartment is cooled. In the above manner, cooler capability is achieved.

The vapor-phase refrigerant, which evaporates in the first evaporator 15, is suctioned by the compressor 12, and circulates again in the refrigerant circulation channel 11. Also, an ejector cycle of the present embodiment includes a branch passage 16, which branches from a part of the refrigerant circulation channel 11 between the radiator 13 and the ejector 14. The branch passage 16 merges into the refrigerant circulation channel 11 at the refrigerant suction portion 14c of the ejector 14.

The branch passage 16 is provided with a restrictor mechanism 17, and is also provided with the second evaporator 18 downstream of the restrictor mechanism 17 in the direction of the refrigerant flow. The second evaporator 18 of the present embodiment constitutes cooling means inside a case of a cool box installed in the passenger compartment (not shown). The cool box may be named as a refrigerator in the passenger compartment. Air in the cool box is blown by an electric air blower 27 (second air blower) to the second evaporator 18.

The restrictor mechanism 17 serves as pressure reducing means for adjusting the flow of refrigerant flowing toward the second evaporator 18, and the restrictor mechanism 17 employs a structure having a solenoid valve and a fixed restrictor in the present embodiment. In other words, the solenoid valve of the restrictor mechanism 17 is an opening/closing valve that allows and inhibits the refrigerant flow to the second evaporator 18. The fixed restrictor of the restrictor mechanism 17 adjusts the flow of the refrigerant to the second evaporator 18 when the solenoid valve is opened. It should be noted that the restrictor mechanism 17 may be configured by a single flow regulating valve that electrically regulates an area of the passage for the refrigerant.

The branch passage 16 includes high-pressure side refrigerant pipes 16a and 16b (an underfloor high-pressure pipe 16a and a passenger-compartment high-pressure pipe 16b) and a suction pipe 16c. The underfloor high-pressure pipe 16a and the passenger-compartment high-pressure pipe 16b are provided on an inlet side of the restrictor mechanism 17. The suction pipe 16c connects an outlet side of the second evaporator 18 with the refrigerant suction portion 14c of the ejector 14. It should be noted that in the present embodiment the electromagnetic pressure control device 12a of the compressor 12, the first and second air blowers 26, 27, and the solenoid valve of the restrictor mechanism 17 are electrically controlled based on control signals outputted by an electronic control unit (ECU) 25.

Figure 2:
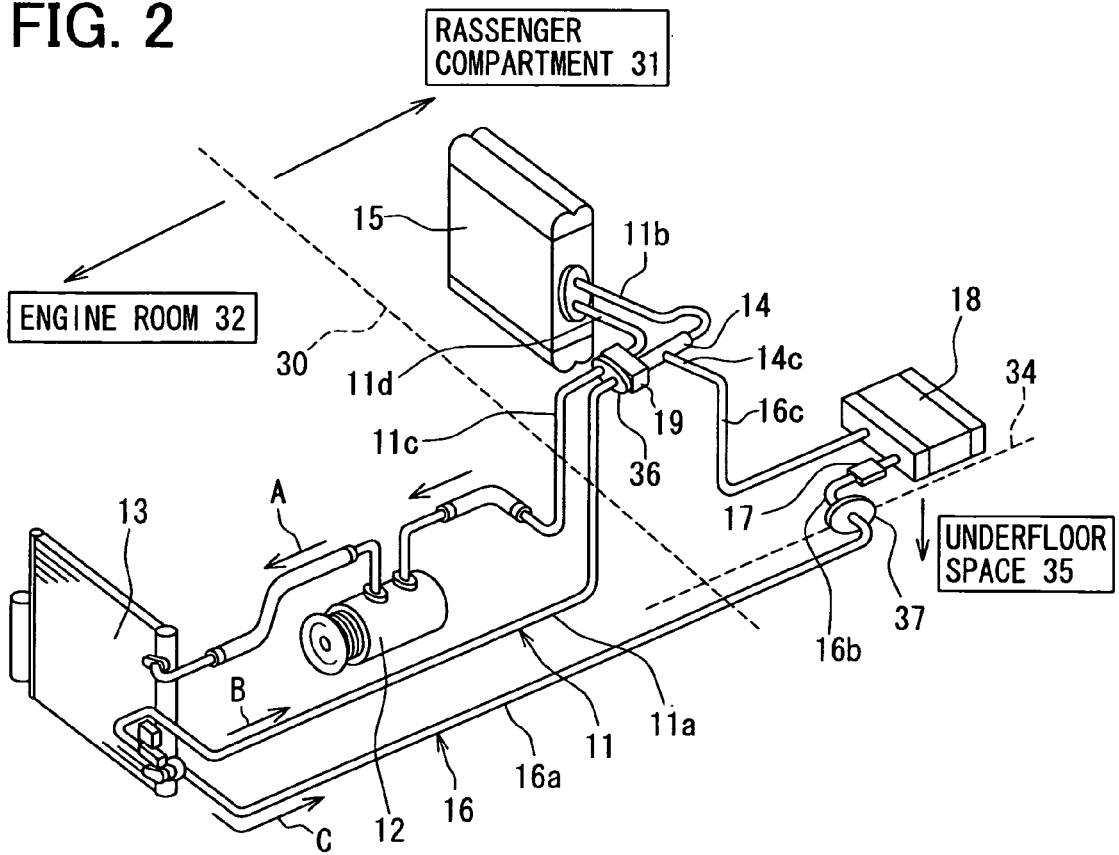
FIG. 2 is a perspective view of the vehicular refrigeration system in FIG. 1 in a vehicle mount state, where the vehicular refrigeration system is mounted in a vehicle.

FIG. 2 is a perspective view showing a general vehicle mount state, where the vehicular refrigeration system in FIG. 1 is mounted in the vehicle. In FIG. 2, a dashed line 30 indicates a dashboard (partition panel) that partitions the vehicle into (a) a passenger compartment 31 and (b) an engine room 32. In other words, the dashboard separates the passenger compartment 31 from the engine room 32. The box-type expansion valve 19, the ejector 14, the first evaporator 15, the restrictor mechanism 17, the second evaporator 18, and the first and second air blowers 26, 27 among cycle configuration components are mounted inside the passenger compartment 31.

In contrast, the compressor 12 and the radiator 13 are mounted inside the engine room 32. Note that, the air-conditioning unit 10 (see FIG. 7, 8), which includes the first evaporator 15 therein, is usually provided at an inward of a gage board (instrument panel) provided at a front part in the passenger compartment 31. The box-type expansion valve 19 and the ejector 14 are assembled to form a component assembly 20 (described later), and the component assembly 20 is assembled to the first evaporator 15. Also, the cool box, which includes the second evaporator 18 therein, is provided near a center console portion in the passenger compartment 31.

A required cooling (cooler) capacity of the first evaporator 15 is substantially larger than a required cooling capacity of the second evaporator 18. The component assembly 20, which includes the box-type expansion valve 19 and the ejector 14, is provided in the passenger compartment 31 at a position near the first evaporator 15, which has a greater cooling (cooler) capacity. In other words, the component assembly 20 is located near the air-conditioning unit 10.

The partition panel 30 is provided with a pipe connector 36 (pipe connecting member), and the pipe connector 36 provides connection between (a) an engine-room high-pressure pipe 11a of the refrigerant circulation channel 11 and (b) a passenger-compartment high-pressure pipe 11b of the refrigerant circulation channel 11. Also, the pipe connector 36 provides connection between (a) an engine-room low-pressure pipe 11c of the refrigerant circulation channel 11 and (b) a passenger-compartment low-pressure pipe 11d of the refrigerant circulation channel 11. In the above, the engine-room high-pressure pipe 11a and the engine-room low-pressure pipe 11c are installed in the engine room 32, and the passenger-compartment high-pressure pipe 11b and the passenger-compartment low-pressure pipe 11d are installed in the passenger compartment 31. Also, because the ejector 14 and the second evaporator 18 are both provided in the passenger compartment 31, an entirety of the suction pipe 16c on an outlet side of the second evaporator 18 is provided in the passenger compartment 31.

The restrictor mechanism 17 and the second evaporator 18 are provided at a position near a floor panel 34 in the passenger compartment 31. The floor panel 34 is provided with a pipe connector 37, and the pipe connector 37 provides connection between (a) the underfloor high-pressure pipe 16a of the branch passage 16, which pipe is provided at an underfloor space 35, and (b) the passenger-compartment high-pressure pipe 16b, which is position on an inlet side of the restrictor mechanism 17. It should be noted that, the restrictor mechanism 17 may be provided below the floor panel 34 (in the underfloor space 35), or in other words, the restrictor mechanism 17 may be provided on a side of the floor panel 34 toward the underfloor high-pressure pipe 16a. Also, although the ECU 25 is usually provided in the passenger compartment 31, the ECU 25 may be alternatively provided outside the passenger compartment 31. For example, the ECU 25 may be provided in the engine room 32.

Figure 3:
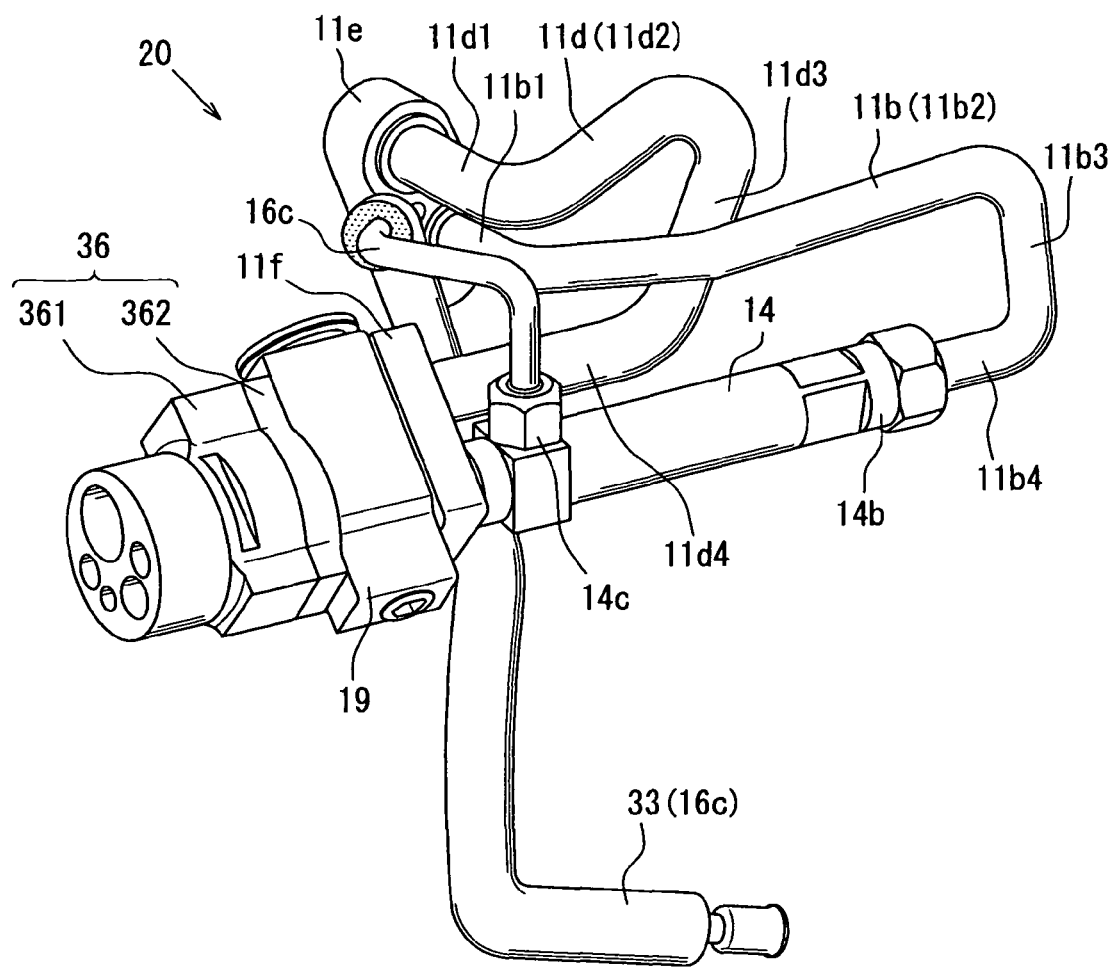
FIG. 3 is a perspective view showing a configuration of a refrigeration-cycle component assembly of one embodiment of the present invention.
Figure 4:
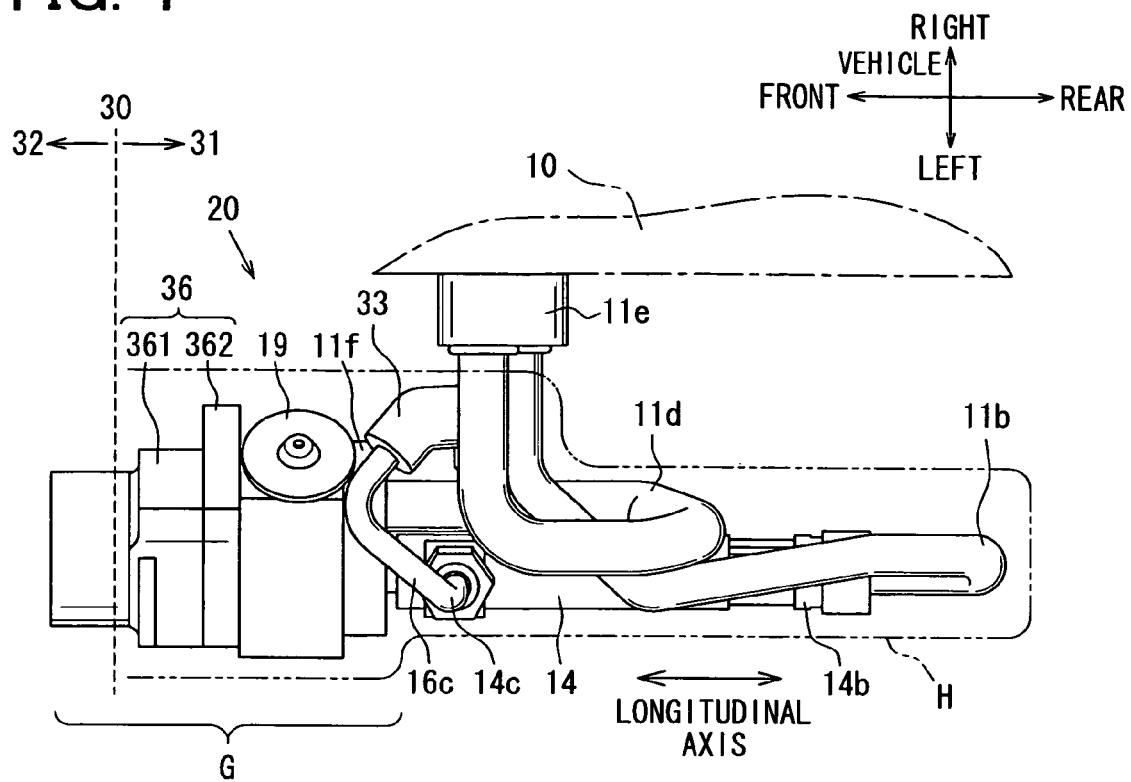
FIG. 4 is a plan view of the refrigeration-cycle component assembly in FIG. 3.

FIG. 3 is a perspective view showing a configuration of the refrigeration-cycle component assembly 20 of the present embodiment, and FIG. 4 is a plan view of the refrigeration-cycle component assembly 20 of FIG. 3 observed from above. It should be noted that a lower end side of the suction pipe 16c is omitted in FIGS. 4 and 5. A structure will be described in an sequential order of the assembly procedure.

Firstly, both ends of each of the passenger-compartment high-pressure pipe 11b and the passenger-compartment low-pressure pipe 11d, both of which constitute a pipe sub-assembly, are processed for connection, and the pipes 11b and 11d are bent. Then, one end of each of pipes 11b, 11d is crimped to a pipe connector 11e in a fixed relation. The pipe connector 11e serves as a pipe connecting member that connects both pipes 11b, 11d with the first evaporator 15.

As shown in FIGS. 3 and 4, the high-pressure pipe 11b includes a first pipe portion 11b1, a second pipe portion 11b2, a third pipe portion 11b3, and a fourth pipe portion 11b4. The first pipe portion 11b1 extends from the pipe connector 11e in a transverse direction of the vehicle (leftward of the vehicle). The second pipe portion 11b2 extends from the first pipe portion 11b1 in a fore-and-aft direction of the vehicle (rearward of the vehicle), The third pipe portion 11b3 extends from the second pipe portion 11b2 in an up-down direction of the vehicle (downward). The fourth pipe portion 11b4 extends from the third pipe portion 11b3 in the fore-and-aft direction of the vehicle (frontward of the vehicle) and is provided generally in parallel with the second pipe portion 11b2.

As is apparent in FIG. 3, the second pipe portion 11b2, the third pipe portion 11b3, and the fourth pipe portion 11b4 are provided on an approximately similar vertical plane. As is also apparent in FIG. 5 that shows the side view of the component assembly 20, the second pipe portion 11b2, the third pipe portion 11b3, and the fourth pipe portion 11b4 are bent such that the pipe portions 11b2, 11b3, 11b4 have a U-shape in combination with each other.

Similarly, the low-pressure pipe 11d includes a first pipe portion 11d1, a second pipe portion 11d2, a third pipe portion 11d3, and a fourth pipe portion 11d4. The second pipe portion 11d2, the third pipe portion 11d3, and the fourth pipe portion 11d4 are provided on an approximately similar vertical plane, and the second pipe portion 11d2, the third pipe portion 11d3, and the fourth pipe portion 11d4 are bent such that the pipe portions 11d2, 11d3, 11d4 have another U-shape in combination with each other.

As above, after the one end of the high-pressure pipe 11b and the one end of the low-pressure pipe 11d are both fixed to the pipe connector 11e, the other end of the high-pressure pipe 11b is clamped to the diffuser portion 14b of the ejector 14 via a pipe nut. As a result, the other end of the low-pressure pipe 11d and the other end of the ejector 14 (a left end portion of the ejector 14 in FIG. 3) are positioned on the approximately similar vertical plane. Next, the other end of the low-pressure pipe 11d and the other end of the ejector 14 are inserted into a presser plate 11f for pipe connection, and the other end of the low-pressure pipe 11d and the other end of the ejector 14 are provisionally fixed to the presser plate 11f.

The box-type expansion valve 19 and a passenger-compartment plate 362 of the pipe connector 36 are in a sequential order stacked onto the presser plate 11f, which is provisionally fixed to the other end of the low-pressure pipe 11d and the other end of the ejector 14 as above, while recess/projection portions (not shown) for connection of the box-type expansion valve 19 and the passenger-compartment plate 362 are being fitted or engaged. Next, by tightening two bolts (not shown) to the presser plate 11f from the passenger-compartment plate 362, the box-type expansion valve 19 is fixed to the other end of the low-pressure pipe 11d and the other end of the ejector 14 in a state, where the box-type expansion valve 19 is provided between the presser plate 11f and the passenger-compartment plate 362.

Next, an engine-room block 361 of the pipe connector 36 is stacked or arranged onto an end portion of the passenger-compartment plate 362 (left end surface in FIG. 3) by fitting recess/projection portions (not shown) for connection of the engine-room block 361 and the passenger-compartment plate 362. Then, by tightening two bolts (not shown) to the passenger-compartment plate 362 from the engine-room block 361, the engine-room block 361 is fixed to the end portion of the passenger-compartment plate 362.

When the air-conditioning unit 10 is assembled to the passenger compartment 31, a cylindrical portion of the engine-room block 361 project in the engine room 32 through a through hole provided in the dashboard 30 such that the engine-room block 361 is able to be connected with a pipe in the engine room 32. Then, the suction pipe 16c is connected with the refrigerant suction portion 14c of the ejector 14, and is fastened by a pipe nut such that a main structure of the refrigeration-cycle component assembly 20 according to the present embodiment is completed. It should be noted that the refrigerant suction portion 14c is provided above the ejector 14 as is apparent in FIG. 5.

When the refrigeration cycle is operated, low-temperature refrigerant on an outlet side of the second evaporator 18 flows into the suction pipe 16c. Thus, if a metal outer surface of the suction pipe 16c is directly exposed to the passenger compartment 31, the passenger compartment 31 is cooled, and thereby moisture condensation is generated on the metal outer surface of the suction pipe 16c. Thus, a pipe insulator 33 (heat insulating member) for limiting the generation of moisture condensation is provided throughout the length of the metal outer surface of the suction pipe 16c.

Features of the above component assembly 20 will be described below. As shown in FIG. 4, the component assembly 20 is arranged in a flat space H at a side of the air-conditioning unit 10 in the vehicle transverse direction (a left side of the vehicle). In the above, the flat space H has a shape that is flat or narrow in the vehicle transverse direction. Also, in the vehicle front side in the flat space H, a refrigerant inflow portion and a refrigerant outflow portion of the component assembly 20 are intensively arranged or arranged in a compact manner. In the above, the refrigerant inflow portion and the refrigerant outflow portion correspond to the pipe connectors 11e, 36 and the refrigerant suction portion 14c.

Further, the box-type expansion valve 19 and the ejector 14 are arranged on an extension of a central axis of the pipe connector 36 such that the box-type expansion valve 19 and the ejector 14 are arranged along a longitudinal axis of the flat space H. Thus, a rigid body portion G of the component assembly 20 is arranged toward the vehicle front side, and tube members (pipe portions), such as the ejector 14 and pipes 11b, 11d, are arranged toward the vehicle rear side. Thus, the suction pipe 16c, which is connected with the exterior, is connected with a side of the ejector 14 toward the rigid body portion G. Also, both pipes 11b, 11d are bent along the ejector 14 such that the tube members arranged toward the vehicle rear side have curved shapes. Accordingly, the rigid body portion G and the tube members are effectively arranged in the flat space. In the above, the rigid body portion G includes the pipe connector 36 and the box-type expansion valve 19, for example, as shown in FIG. 4.

That is, the ejector 14 is provided on a plane, which is generally similar to a plane defined by the second to fourth pipe portions 11b2 to 11b4 of the above high-pressure pipe 11b. Also, a plane defined by the high-pressure pipe 11b is configured to overlap with a plane defined by the second to fourth pipe portions 11d2 to 11d4 of the low-pressure pipe 11d. In the above configuration, the pipe portion is defined as the flat space.

Figure 5:
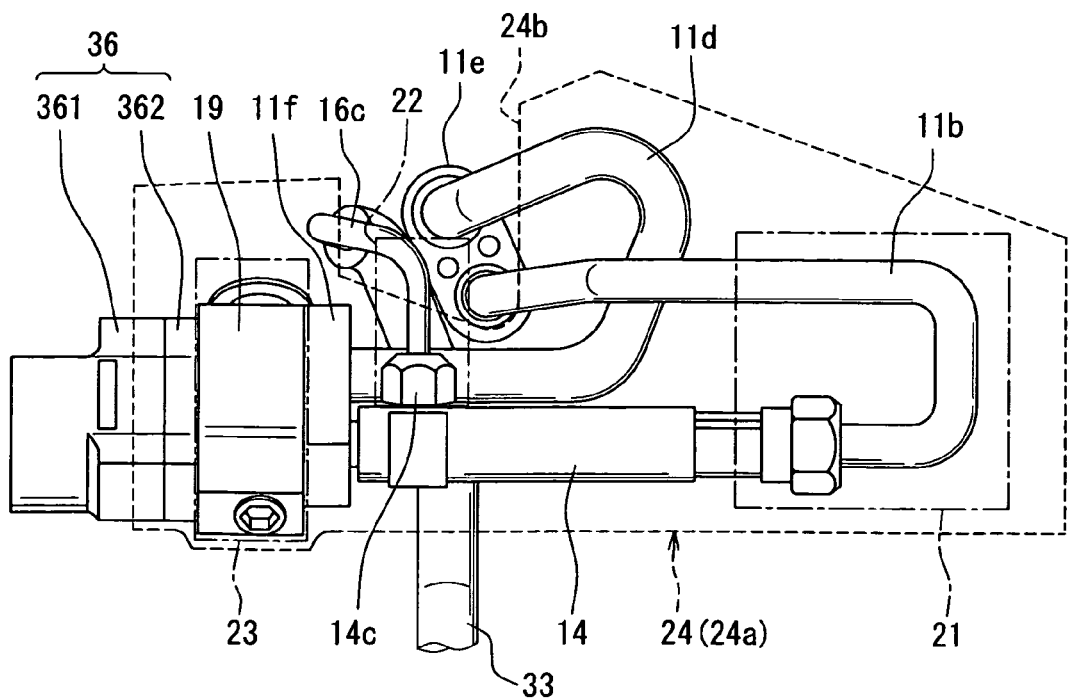
FIG. 5 is a side view for explaining the assembling of gaskets to the refrigeration-cycle component assembly.
Figure 6:
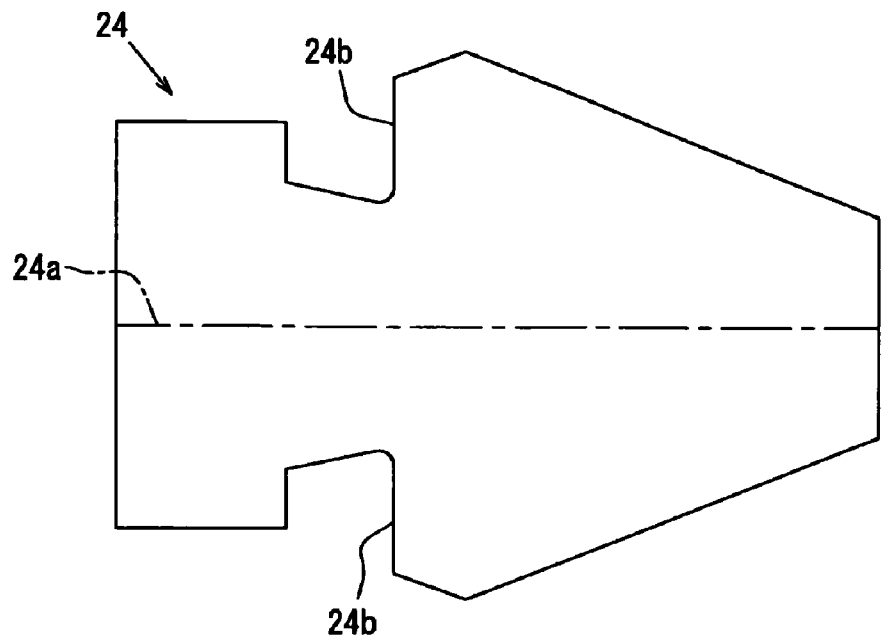
FIG. 6 is a development showing one of the gaskets in FIG. 5.

FIG. 5 is a side view for explaining the attachment of gaskets 21 to 24 to the refrigeration-cycle component assembly 20, and FIG. 6 is a development of the gasket 24 in FIG. 5. The component assembly 20 corresponds to a part that is associated with large sound pressure and vibration level due to the passing of the refrigerant during the operation of the refrigeration cycle, and thereby the component assembly 20 is attached with the gaskets 21 to 23 made of butyl rubber at three positions described below.

The gasket 21 is positioned to cover a pipe part ranging from the outlet portion of the ejector 14 to the downstream side. Thus, the refrigerant flow noise caused by the fast refrigerant flow at the outlet portion of the ejector 14 is limited from being transmitted to the passenger compartment 31. Specifically, a rectangular butyl rubber sheet is folded such that the U-shaped folded part of the pipe is provided between the two sides of the folded rubber sheet.

The gasket 22 is positioned to cover a vicinity of a connection portion of the suction pipe 16c. Thus, the noise caused by the merge of the refrigerant in the ejector 14 is limited from being transmitted to the suction pipe 16c. Specifically, the butyl rubber sheet is wrapped around the pipe connection portion, which is positioned between the suction pipe 16c and the refrigerant suction portion 14c. The gasket 23 is positioned to cover an outer surface of the box-type expansion valve 19. Thus, noise caused by the pressure reduction of the refrigerant inside the box-type expansion valve 19 is limited from being transmitted to the passenger compartment 31. Specifically, a narrow rectangular butyl rubber sheet is wrapped around an outer surface of the box-type expansion valve 19.

Also, during the operation of the refrigeration cycle, the low-temperature refrigerant flows through the component assembly 20. Thus, the outer surface of the component assembly 20 is covered by attaching the gasket 24 thereto. The gasket 24 corresponds to a heat insulating member for limiting the moisture condensation. The above configuration is effective for dealing with or for suppressing the above noise. Specifically, the gasket 24 has a line symmetric outer shape symmetrical relative to a center line 24a shown in FIG. 6. In order to limit the moisture condensation water from dropping, a part of the gasket 24, which part corresponds to the center line 24a, is attached to the underside of the component assembly 20. Then, the component assembly 20 is covered from both sides relative to the center line 24a by folding the gasket 24 along the center line 24a, and then the peripheral parts of the gasket 24 are bonded together.

Also, the gasket 24 is provided with cut parts 24b at both symmetrical ends relative to the center line 24a (see FIGS. 5, 6). The above cylindrical portion of the engine-room block 361 projects from a vehicle front side of the bonding portion of the gasket 24, which is bonded as above. Also, both pipes 11b, 11d, which go toward the first evaporator 15, and the suction pipe 16c extend from the cut parts 24b, which are located at an upper position after the bonding.

The cut parts 24b serve as a cut that provides an opening for a fastening portion of the component assembly 20 when the component assembly 20 is fasten to the side face of the air-conditioning unit 10 after the attachment of the gasket 24. The gasket 24 may be made of a material, or, specifically, of a foamed resin material (porous resin material), such as urethane.

Figure 7:
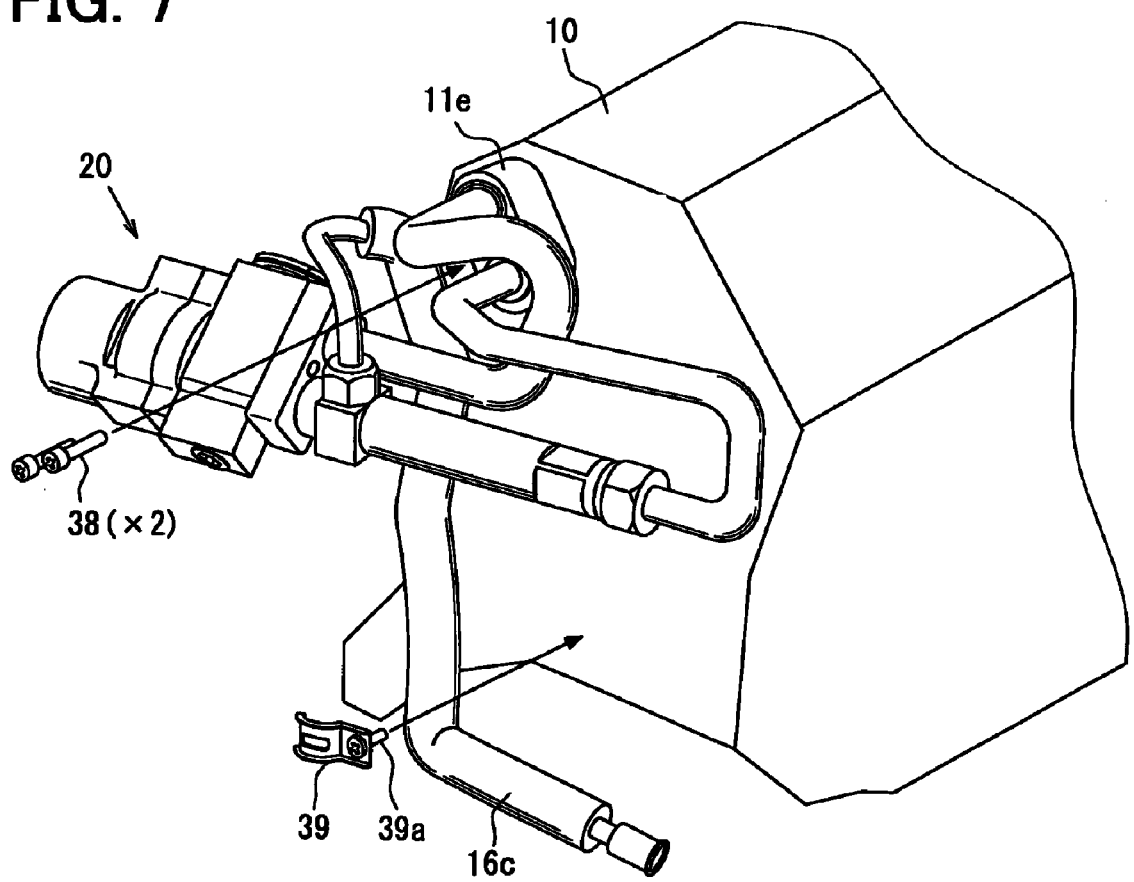
FIG. 7 is a perspective view showing a method for assembling the refrigeration-cycle component assembly to an air-conditioning unit.
Figure 8:
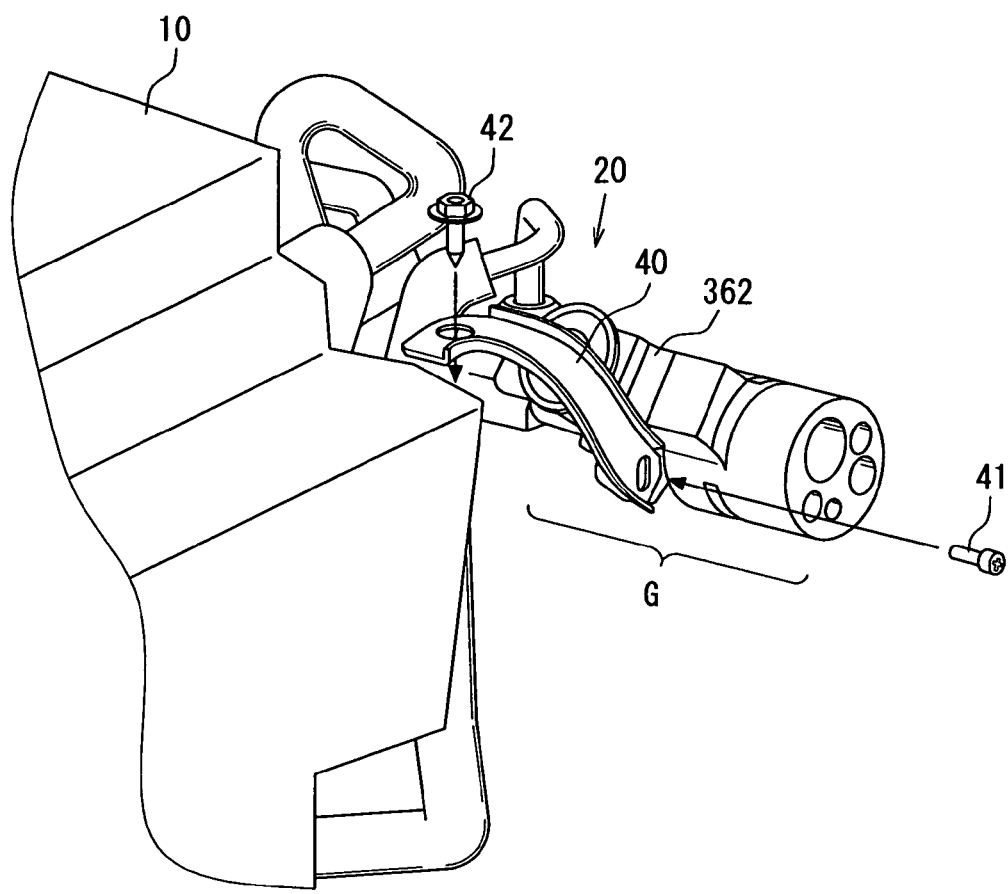
FIG. 8 is a perspective view showing a method for fixing the refrigeration-cycle component assembly via a bracket.

FIG. 7 is a perspective view showing a method for assembling the refrigeration-cycle component assembly 20 to the air-conditioning unit 10, and FIG. 8 is a perspective view showing a method for fixing the refrigeration-cycle component assembly 20 by a bracket 40. It should be noted that in both FIGS. 7, 8, the gaskets 21 to 24 attached to the outer surface are omitted. The above assembled component assembly 20 attached with the gaskets 21 to 24 is connected to the side face of the air-conditioning unit 10 in a fixed relation.

A pipe connection portion (not shown) of the first evaporator 15 housed in the air-conditioning unit 10 is exposed at the outer surface of a case of the air-conditioning unit 10. Firstly, as shown in FIG. 7, the pipe connector 11e is stacked or placed onto the pipe connection portion, and is connected with the exposed pipe connection portion by fitting recess/projection portions (not shown) for connection. Then, the pipe connector 11e and the pipe connection portion are fastened with each other by using two bolts 38. The lower side of the suction pipe 16c is pressed toward the air-conditioning unit 10 by a pipe clamp 39, and is fixed to the air-conditioning unit 10 by a threaded member 39a.

Also, the component assembly 20 is supported by the bracket 40 (support) as shown in FIG. 8. One end side of the bracket 40 is fastened to the passenger-compartment plate 362 of the rigid body portion G, which corresponds to a center-of-mass position of the component assembly 20, by a bolt 41, and the other end side of the bracket 40 is fastened to the outer surface of the case of the air-conditioning unit 10 by a threaded member 42.

Next, an operation of the present embodiment of the above configuration will be described with reference to FIGS. 1, 2. When the compressor 12 is driven by the vehicle engine, the compressor 12 compresses refrigerant. The compressed refrigerant in a high-temperature and high-pressure state is pumped in a direction indicated by an arrow A to flow into the radiator 13. In this configuration, in a case, where the cool box is used, the solenoid valve of the restrictor mechanism 17 is energized to open the solenoid valve.

Then, in the radiator 13, the high-temperature refrigerant is cooled by external air to be condensed. A liquid-phase refrigerant flows out of the radiator 13, and diverges into (a) a flow, which flows through the refrigerant circulation channel 11 in a direction indicated by an arrow B, and (b) another flow, which flows through the branch passage 16 in a direction indicated by an arrow C. The pressure of the refrigerant, which flows through the branch passage 16 in the direction C, is reduced by the restrictor mechanism 17 to be a low pressure, and the low pressure refrigerant evaporates in the second evaporator 18 by absorbing heat from air in the cool box, into which the air is blown by the second air blower 27. Thus, the second evaporator 18 effects a cooling operation in the cool box.

In the above, the refrigerant flow flowing through the branch passage 16, in other words, the refrigerant flow flowing through the second evaporator 18, is independently adjusted by the fixed restrictor of the restrictor mechanism 17. Specifically, the fixed restrictor may be an orifice or a capillary tube, in the present embodiment. Accordingly, the cooling capacity for a cooling target space (specifically a space in the cool box), which capacity is achieved by the second evaporator 18, is controlled by the refrigerant flow adjusted by the fixed restrictor and by the rotational speed (amount of blast) by the second air blower 27.

The vapor-phase refrigerant flows out of the second evaporator 18, and flows through the suction pipe 16c to be suctioned into the refrigerant suction portion 14c of the ejector 14. In contrast, the refrigerant flowing through the refrigerant circulation channel 11 in the direction B flows into the ejector 14. Then, the pressure of the refrigerant is reduced by the nozzle portion 14a, and the refrigerant is expanded. As a result, the pressure energy of the refrigerant is converted into the speed energy in the nozzle portion 14a, and the refrigerant is ejected through the ejection orifice of the nozzle portion 14a at a high speed. Due to the decrease of the refrigerant pressure at the above time, the vapor-phase refrigerant, which has evaporated in the second evaporator 18, is suctioned through the refrigerant suction portion 14c.

The refrigerant ejected through the nozzle portion 14a and the other refrigerant suctioned through the refrigerant suction portion 14c are mixed with each other at a position downstream of the nozzle portion 14a, and then flows into the diffuser portion 14b. Because the expansion of the area of the passage converts the speed (expansion) energy of the refrigerant into the pressure energy of the refrigerant in the diffuser portion 14b, pressure of the refrigerant is increased. The refrigerant flowing out of the diffuser portion 14b of the ejector 14 flows into the first evaporator 15.

In the first evaporator 15, the refrigerant evaporates by absorbing heat from air for air conditioning, which air is blown into the passenger compartment 31. The vapor-phase refrigerant, which has evaporated, is suctioned into the compressor 12, and is compressed therein to flow again through the refrigerant circulation channel 11 in the direction A. In the above, the ECU 25 operates a volume control of the compressor 12 to control the refrigerant discharge capacity of the compressor 12. As a result, the refrigerant flow to the first evaporator 15 is adjusted. Also, the ECU 25 controls the rotational speed (amount of blast) of the first air blower 26 to control a cooling capacity by the first evaporator 15 for cooling the cooling target space, specifically the cooler capacity in the passenger compartment 31.

FIG. 9A a schematic partial cross sectional drawing showing a connection state of the box-type expansion valve 19 and the ejector 14, and FIG. 9B is an enlarged view of an O-ring portion in FIG. 9A. In the normal expansion valve cycle, the refrigerant is reduced in pressure from high-pressure to low-pressure around the restrictor portion S1, and thereby there has been no substantial issue. In the present embodiment, the first restrictor portion S1 of the box-type expansion valve 19 and a second restrictor portion S2 of the ejector 14 are provided to have a double restrictor configuration.

Accordingly, a pressure of the refrigerant in a space between both restrictor portions S1, S2 corresponds to an intermediate pressure, and the intermediate pressure is applied to the O-ring of a transmission rod. That is, a differential pressure between (a) the intermediate pressure and (b) the low-pressure in the low-pressure side refrigerant passage 19a urges the O-ring toward the low-pressure side refrigerant passage 19a. Conventionally, both upper and lower walls of a groove that receives the O-ring were chamfered similar to a chambered corner of the lower wall of the groove shown in FIG. 9B. However, stress tends to be concentrated on a contact part of the O-ring portion, which contact part contacts the chamfered corner of the groove, and thereby the deterioration of the O-ring portion may be accelerated. Thus, in the present embodiment, at least the pressed corner of the groove, which corner is pressed against the O-ring portion, is rounded as shown in FIG. 9B such that the stress is mitigated advantageously.

Next, the features of the present embodiment and the advantages of the present embodiment will be described. Firstly, the air-conditioning unit 10 receives the first evaporator 15. The component assembly 20 is arranged inside the flat space H, which is provided on a side of the air-conditioning unit 10 in the vehicle transverse direction, and which has a flat or narrow shape in the vehicle transverse direction. Also, the refrigerant inflow portion and the refrigerant outflow portion of the component assembly 20 are intensively arranged on the vehicle front side 0n the flat space H. Furthermore, the component assembly 20 is entirely covered by the gasket 24. Due to the above configuration, even when the ejector 14 is provided inside the passenger compartment 31, the ejector 14 is limited from projecting from the air-conditioning unit 10, and thereby the ejector 14 is accommodated in a small space. Also, because the component assembly 20 is entirely covered by the gasket 24, the moisture condensation and the refrigerant flow noise are effectively dealt with.

Also, the box-type expansion valve 19 and the ejector 14 are provided on the extension of the central axis of the pipe connector 36, and are provided along the longitudinal axis of the flat space H. More specifically, the pipe connector 36, the box-type expansion valve 19, and the ejector 14 are sequentially connected, and also are arranged along the longitudinal axis of the flat space H. Due to the above configuration, the structure is made effectively compact or small without an unnecessary space.

Also, the passenger-compartment high-pressure pipe 11b and the passenger-compartment low-pressure pipe 11d are bent and arranged inside the flat space H. Due to the above configuration, because both pipes 11b, 11d are bent inside the flat space H, the gasket 24 is folded such that both pipes 11b, 11d are provided between the folded sides of the gasket 24 for heat insulation. Thus, the attachment of the gasket 24 is effectively facilitated.

Also, the suction pipe 16c, which introduces the refrigerant to the refrigerant suction portion 14c of the ejector 14, extends along the flat space H from the lower side to the upper side. The suction pipe 16c is bent to be arranged above the refrigerant suction portion 14c such that the suction pipe 16c is connected with the refrigerant suction portion 14c in the flat space H from thereabove. Due to the above configuration, in a case, where the refrigerant circulation of the refrigeration cycle stops, refrigeration oil is limited from falling into the suction pipe 16c. Also, the suction pipe 16c is enabled to be arranged along both the pipes 11b, 11d toward the first evaporator 15. Thereby, the attachment of the gasket 24 is effectively facilitated.

Also, the bracket 40 is provided to connect the component assembly 20 with the air-conditioning unit 10 in a supported relation, the one end of the bracket 40 is connected only with a vicinity of the rigid body portion G that is formed by connecting the pipe connector 36 with the box-type expansion valve. 19. Due to the above configuration, the bracket 40 is made support the component assembly 20 at a position near the center of mass of the component assembly 20. The position of the center of mass is effective as a support position for supporting the bracket 40. Because the position of the center of mass (supporting position) is away from both the above pipes 11b, 11d, the attachment of the gasket 24 to both the above pipes 11b, 11d is not inhibited by the bracket 40.

Also, the gasket 24 has a line symmetrical outline shape, which is symmetrical relative to a reference line (the center line 24a) before the gasket 24 is attached or in a state, where the gasket 24 is developed. The gasket 24 is attached to the component assembly 20 by folding the symmetrical ends of the gasket 24 along the center line 24a of the gasket 24 and by bonding the symmetrical ends to each other. Due to the above configuration, the attachment process of the gasket 24 is effectively facilitated. Also, the above component assembly 20 is provided in the vehicular refrigeration system. Due to the above configuration, the ejector 14 is provided in the passenger compartment 31 within a small space, and also the refrigeration cycle, which is configured to able to deal with the moisture condensation and the refrigerant flow noise, is provided.

(Other Embodiment)

The present invention is not limited to the above embodiment, and the following modification or expansion may be made.

(1) In the above embodiment, the present invention is applied to a vehicular air-conditioning and refrigeration apparatus. However, another embodiment may be made, in which (a) the first evaporator 15 having a relatively higher refrigerant evaporation temperature and (b) the second evaporator 18 having a relatively lower refrigerant evaporation temperature are both mounted in the passenger compartment 31 such that each of the first and second evaporators 15, 18 serves as a cooler for a different region (for example, a front seat region and a rear seat region in the passenger compartment 31).

(2) Alternatively, both of (a) the first evaporator 15 having the relatively higher evaporation temperature and (b) the second evaporator 18 having the relatively lower evaporation temperature may be used for cooling inside the cool box. That is, the first evaporator 15 with higher evaporation temperature cools a cold storage room in the cool box, and the second evaporator 18 with lower evaporation temperature cools a freezing room inside the cool box, for example.

(3) In the above embodiment, a kind or type of the refrigerant is not specified. However, the refrigerant may be an alternative refrigerant, such as fluorocarbon refrigerant, hydrocarbon refrigerant. Also, the refrigerant may be carbon dioxide, which is able to be applied to a supercritical cycle and a subcritical cycle of a thermo compression. Also, in an example structure of the above embodiment, a gas-liquid separator is not employed. However, for example, a receiver may be provided downstream of the radiator 13 such that the receiver separates vapor-phase refrigerant from liquid-phase refrigerant for guiding only the separated liquid-phase refrigerant to the downstream side.

(4) In the above embodiment, the compressor 12 employs a variable capacity compressor, and the ECU 25 controls the volume of the variable capacity compressor 12 such that the refrigerant discharge capacity of the compressor 12 is controlled. However, the compressor 12 may alternatively employ a fixed volume compressor. In the above alternative case, the operation of the fixed volume compressor 12 is activated and deactivated by an electromagnetic clutch. By controlling a ratio of activation and deactivation of the compressor 12, the refrigerant discharge capacity of the compressor 12 is controlled alternatively. Also, in a case, where the compressor 12 employs an electric compressor, a rotational speed control of the electric compressor 12 controls the refrigerant discharge capacity.

(5) In the refrigeration cycle configuration of the embodiment shown in FIG. 1, a second branch passage, a restrictor mechanism, and a third evaporator may be alternatively provided. Also, in the above alternative case, the outlet side of the diffuser portion 14*b* of the ejector 14 may be connected with the inlet side of the third evaporator instead of the inlet side of the first evaporator 15.

Additional advantages and modifications will readily occur to those skilled in the art. The invention in its broader terms is therefore not limited to the specific details, representative apparatus, and illustrative examples shown and described.

What is claimed is:

1. A refrigeration-cycle component assembly comprising:
   a pipe connecting member that is provided around a part of a partition panel that separates a passenger compartment from an engine room in a vehicle, a refrigerant circulation passage for a refrigeration cycle extending through the part of the partition panel;
   a box temperature-sensitive expansion valve that is connected with a side of the pipe connecting member toward the passenger compartment, the box temperature-sensitive expansion valve including a first restrictor portion that is pressure reducing means for reducing a pressure of high pressure refrigerant, the box temperature-sensitive expansion valve adjusting an amount of refrigerant, which flows through a high-pressure side refrigerant passage, based on a temperature of refrigerant, which flows through a low-pressure side refrigerant passage;
   an ejector that includes:
      a nozzle portion that is connected with a downstream side of the first restrictor portion of the box temperature-sensitive expansion valve, the nozzle portion including a second restrictor portion that converts a pressure energy of refrigerant, which flows thereinto from the first restrictor portion, into a speed energy such that refrigerant is expanded in a reduced pressure;
      a refrigerant suction portion that suctions vapor-phase refrigerant by using a flow of refrigerant ejected through the nozzle portion at a high speed; and
      a pressure increasing portion that mixes refrigerant ejected through the nozzle portion with vapor-phase refrigerant suctioned through the refrigerant suction portion for converting the speed energy into the pressure energy such that the pressure of refrigerant is increased;
   a passenger-compartment high-pressure pipe that is provided in the passenger compartment for guiding refrigerant flowing out of the pressure increasing portion of the ejector into an evaporator; and
   a passenger-compartment low-pressure pipe that is provided in the passenger compartment for guiding refrigerant flowing out of the evaporator into the low-pressure side refrigerant passage of the box temperature-sensitive expansion valve, wherein:
   the pipe connecting member, the box temperature-sensitive expansion valve and the ejector are assembled together in series,
   the ejector is arranged in such a manner that its longitudinal direction extends in a fore-and aft direction of the vehicle,
   the passenger-compartment high-pressure pipe and the passenger-compartment low-pressure pipe have a pipe portion which extends in a fore-and-aft direction of the vehicle and a pipe portion which extends in an up-down direction of the vehicle,
   the passenger-compartment high-pressure pipe and the passenger-compartment low-pressure pipe include a U-shaped portion bent along the ejector in a vertical plane in such a manner that
   the entire U-shaped portion of the passenger-compartment high-pressure pipe is covered with a rubber gasket,
      the pipe connecting member, the box temperature-sensitive expansion valve, the ejector, the passenger-compartment high-pressure pipe and the passenger-compartment low-pressure pipe are accommodated in a flat space of which vehicle-transverse direction surface is wider than its vehicle-fore-and-aft direction surface,
      the pipe connecting member, a connecting portion between the evaporator and the passenger-compartment high-pressure pipe and the refrigerant suction portion is accommodated in the flat space in the fore-and-aft direction of the vehicle, and
      the pipe connecting member, the box temperature-sensitive expansion valve, the ejector, the passenger-compartment high-pressure pipe and the passenger-compartment low-pressure pipe are covered by a heat insulating member.

2. The refrigeration-cycle component according to claim 1, further comprising:
   a suction pipe for guiding the refrigerant to the refrigerant suction portion of the ejector, wherein
   the suction pipe is provided along the flat space in such a manner as to extend from a lower side to an upper side and extend above the refrigerant suction port in the flat surface.

3. The refrigeration-cycle component according to claim 1, further comprising:
   a rigid body to which the pipe connecting member and the box temperature-sensitive expansion valve are connected, wherein
   the rigid body is supported by a support member in order to be connected to an air-conditioning unit.

4. The refrigeration-cycle component according to claim 1, wherein:
   the heat insulating member has an outline shape, which is symmetrical relative to a center line in a state, where the heat insulating member is developed; and
   the heat insulating member is folded along the center line such that both symmetrical ends of the heat insulating member relative to the center line are attached with each other.

* * * * *